United States Patent [19]

Antonov

[11] Patent Number: 5,423,406
[45] Date of Patent: Jun. 13, 1995

[54] AUTOMATIC CENTRIFUGAL CLUTCH WITH ELECTRIC RELEASE AND HYSTERISIS MEANS

[75] Inventor: Roumen Antonov, Paris, France

[73] Assignee: Antonov Automotive North America, B. V., Rotterdam, Netherlands

[21] Appl. No.: 8,447

[22] Filed: Jan. 22, 1993

[51] Int. Cl.[6] ............... F16D 43/00; F16D 43/20
[52] U.S. Cl. .................. 192/103 A; 192/105 C; 475/153
[58] Field of Search .......... 475/149, 153; 192/3.52, 192/83, 90, 105 C, 106 R, 103 A, 105 A, 105 B

[56] References Cited

U.S. PATENT DOCUMENTS

| | | | |
|---|---|---|---|
| 2,280,736 | 4/1942 | Winther | 192/105 C X |
| 2,555,860 | 6/1951 | Reed | 192/105 C X |
| 2,591,989 | 4/1952 | Winther | 192/90 |
| 2,899,033 | 8/1959 | Bochory | 192/90 |
| 3,003,608 | 10/1961 | Biraben | 192/83 |
| 3,091,315 | 5/1963 | Maurice et al. | 192/105 C X |
| 3,180,469 | 4/1965 | Wiedman et al. | 192/90 |
| 3,184,025 | 5/1965 | Aschauer | 192/90 |
| 3,797,331 | 3/1974 | Kjeldsteen | 175/153 |
| 4,576,269 | 3/1986 | Hamane et al. | 192/105 C X |
| 4,986,403 | 1/1991 | Tipton | 192/105 C X |
| 5,033,598 | 7/1991 | Tipton | 192/83 X |

FOREIGN PATENT DOCUMENTS

| | | | |
|---|---|---|---|
| 2531166 | 2/1984 | France | 192/83 |
| 178069 | 1/1962 | Sweden | 192/103 A |
| 805970 | 12/1958 | United Kingdom | 192/90 |

Primary Examiner—Dirk Wright
Assistant Examiner—Kholo Ta
Attorney, Agent, or Firm—Kenyon & Kenyon

[57] ABSTRACT

An epicyclic train operates as a speed reducer between an input and an output when a clutch is released, and as a direct drive connection in the contrary case. The selective clamping is obtained by centrifugal weights, counter to biasing springs and to an helical teeth reaction force, which is proportional to the torque transmitted during speed-reducing operation. The reaction force promotes speed-reducing operation when the torque to be transmitted is high. Means are provided for applying a force pulse to the weights when the driver depresses the accelerator pedal. Since, upon a ratio change, the reaction force and the friction forces in the clutch vary so as to stabilize the newly created transmission ratio, a force pulse is enough for initiating a ratio change which will then be stabilized by a spontaneous variation of the reaction force and the friction forces.

62 Claims, 4 Drawing Sheets

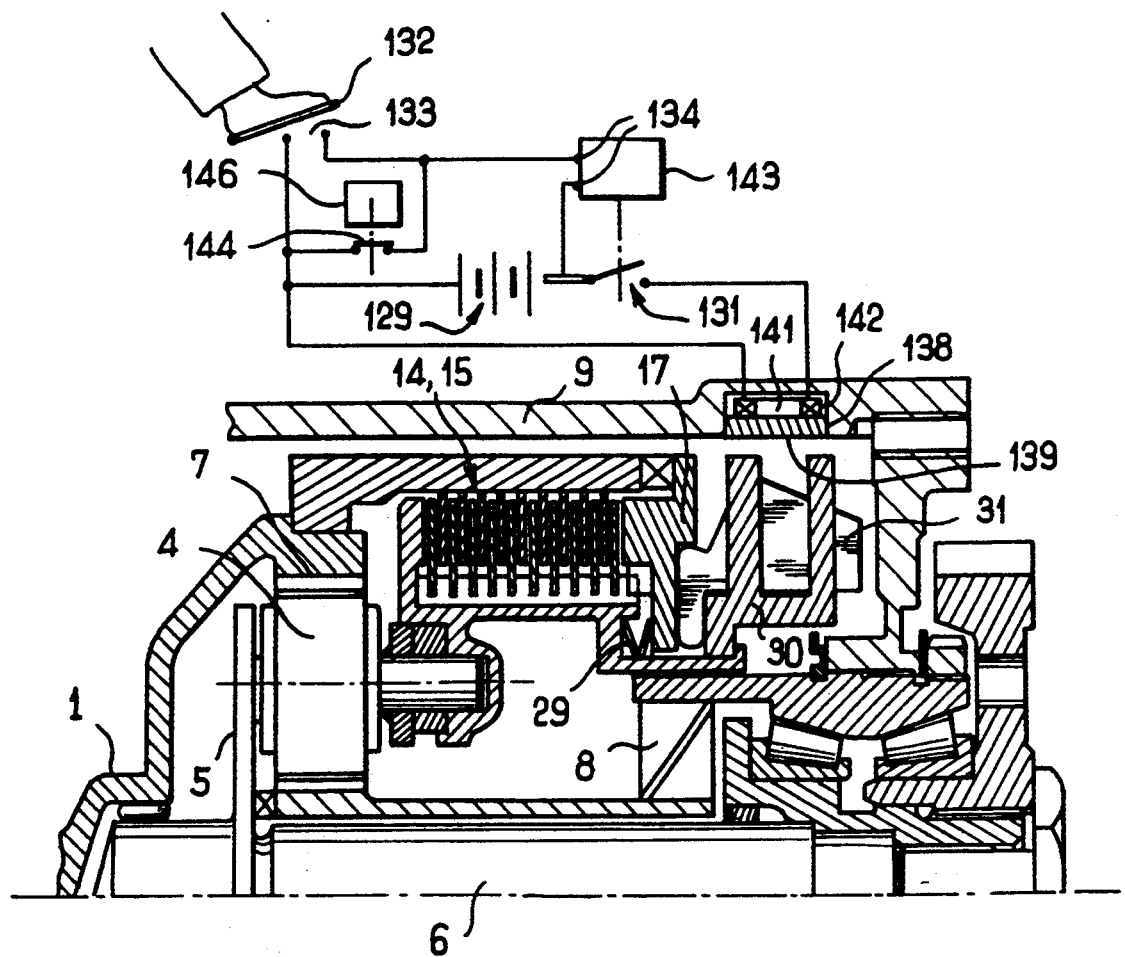
FIG_2
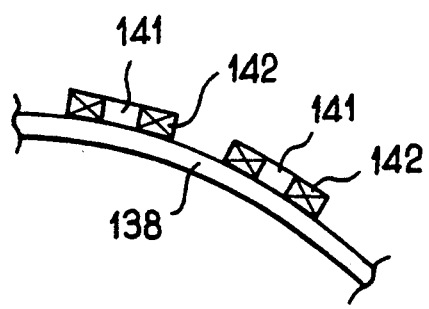
FIG_3

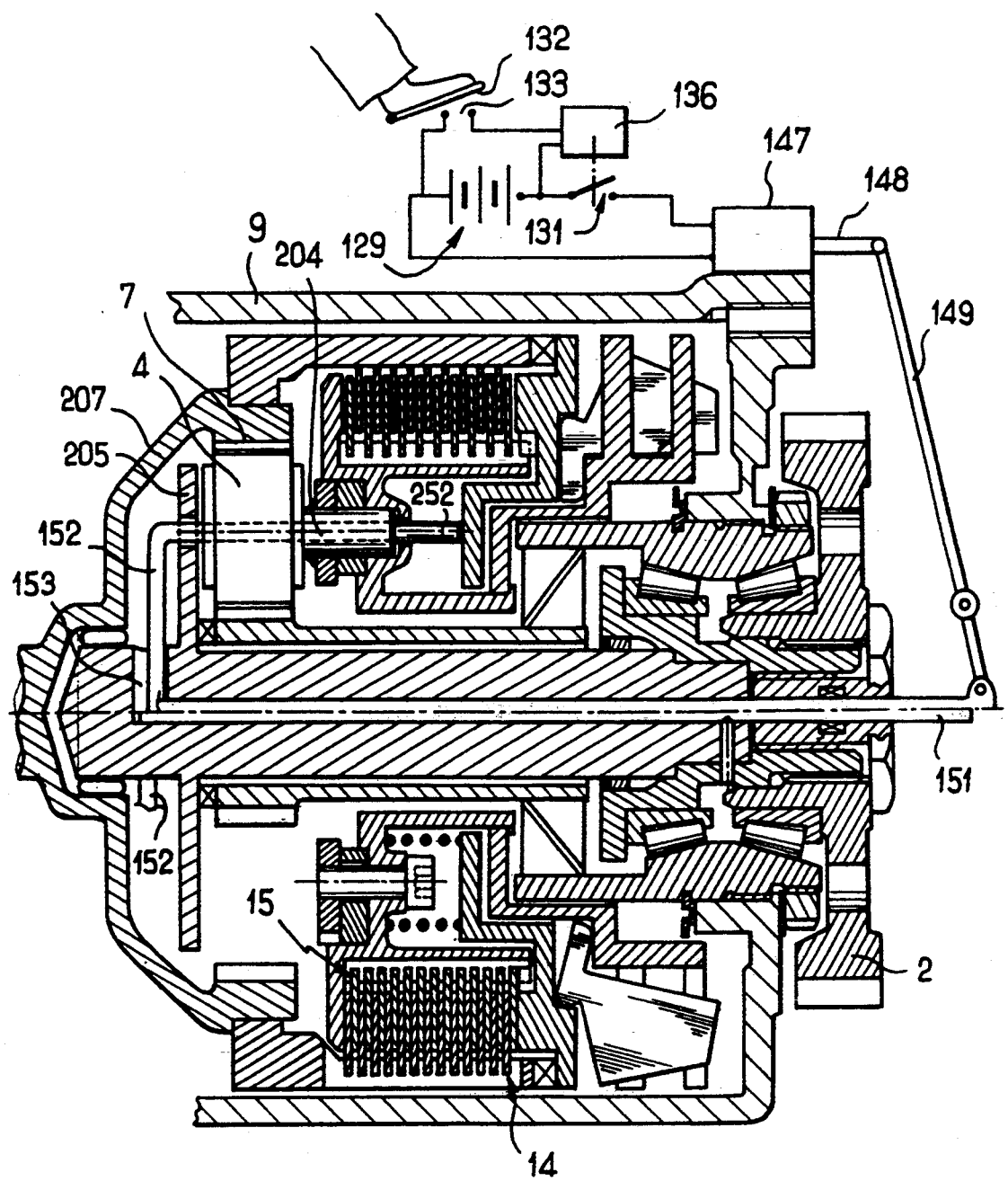
FIG_4

AUTOMATIC CENTRIFUGAL CLUTCH WITH ELECTRIC RELEASE AND HYSTERISIS MEANS

This invention relates to a method for controlling an automatic clutch, for example a clutch of the type controlling a change of ratio in an automatic transmission device, especially for a land motor vehicle.

This invention also relates to an automatic transmission device embodying such a method.

The automatic transmission devices often use clutches, especially of the oil-lubricated multidisks type, which are controlled by clamping means. According to whether the clutch is tightened or not by the clamping means, a combination of gears, typically an epicyclic train, provides a first transmission ratio or a second transmission ratio.

In the conventional automatic transmissions, the clamping means are jacks which abruptly change the clutch from a tightened condition to a fully released condition. This allows very quick controls. It however necessitates a complicated power hydraulic device, controlled by an electronic or hydraulic control circuit cooperating with a plurality of sensors.

The U.S. application Ser. No. 07/768 877 and 780 691, both to the Applicant, show the advantages of transmissions in which at least one clutch is actuated by a thrust which is directly generated inside the transmission and which has a magnitude which, at least in certain operating circumstances, is a monotonous function of a parameter which is relevant for the selection of the transmission ratio, for example the speed of rotation of a component of the gearbox, or the torque transmitted by a component of the gearbox.

With such clamping means, the clutch is more or less tightened or clamped according to the operating conditions. The change of ratio occurs when the clutch, initially in a grip condition, starts to slip because the clamping force applied to it is no longer able to create the gripping force which would be necessary for maintaining both clutch elements at the same speed; or, conversely, when the clutch, initially in the slipping condition, changes to the gripping condition because the clamping force which is applied thereto has become high enough to produce between the disks friction forces corresponding to said torque.

Such automatic clutches allow to suppress the very complicated and expensive control and power hydraulic device which is present in the conventional automatic transmissions.

However, the friction systems in general have the property, in certain intermediate clamping conditions, to remain in the pre-existing condition, independently of the fact that the pre-existing condition is a grip condition or a slip condition. This property is favourable in the automatic transmissions, for avoiding excessively repeated changes of ratio.

But this tendency of remaining in the pre-existing condition can introduce some slowness in the ratio changes.

On the other hand, a ratio change may be desirable in some circumstances in which the normal spontaneous operation of the clutch would lead to maintain the pre-existing ratio.

The object of the invention is to meet these two requirements, and more specifically to provide a method and a transmission allowing to very quickly initiate changes of the condition of the clutch and respectively of the ratio under which the transmission operates.

According to a first aspect of the invention, the control method for initiating a change of condition between a slip condition and a grip condition in a clutch automatically controlled by clamping means applying a clamping thrust which varies as a function of at least one parameter, comprises the step of applying a thrust pulse to the clamping means in a direction corresponding to said change of condition.

Since, in a certain range of clamping forces for each given torque to be transmitted, the clutch tends to remain in its pre-existing condition of slip or grip, said force pulse is fully able to operate the change of condition, whereafter the new condition will also be kept by the clutch.

This method can be used for initiating and expediting a ratio change operation in an automatic transmission, especially for a land vehicle.

It is thus possible, for example, to very quickly control a so-called kick-down operation when the driver of the vehicle needs the full power of the engine.

According to a second aspect of the invention, the automatically shifted transmission device having at least two transmission ratios, comprises a selective coupling clutch and clamping means applying to said clutch a clamping force which varies as a function of an external parameter for controlling the clutch thereby to change the transmission ratio when the parameter varies through a range of magnitudes, and initiator means for selectively applying to the clamping means a force pulse in a predetermined direction for initiating a change of condition of the clutch between a slip condition and a grip condition.

Other features and advantages of the invention will become apparent from the following description which relates to non-limiting examples.

In the accompanying drawings:

FIGS. 2, 4 and 5 are views similar to FIG. 1 but relating to three other embodiments of the transmission; and FIG. 3 shows a detail of the embodiment of FIG. 2, as seen parallel to the axis of the transmission.

Figure 1:
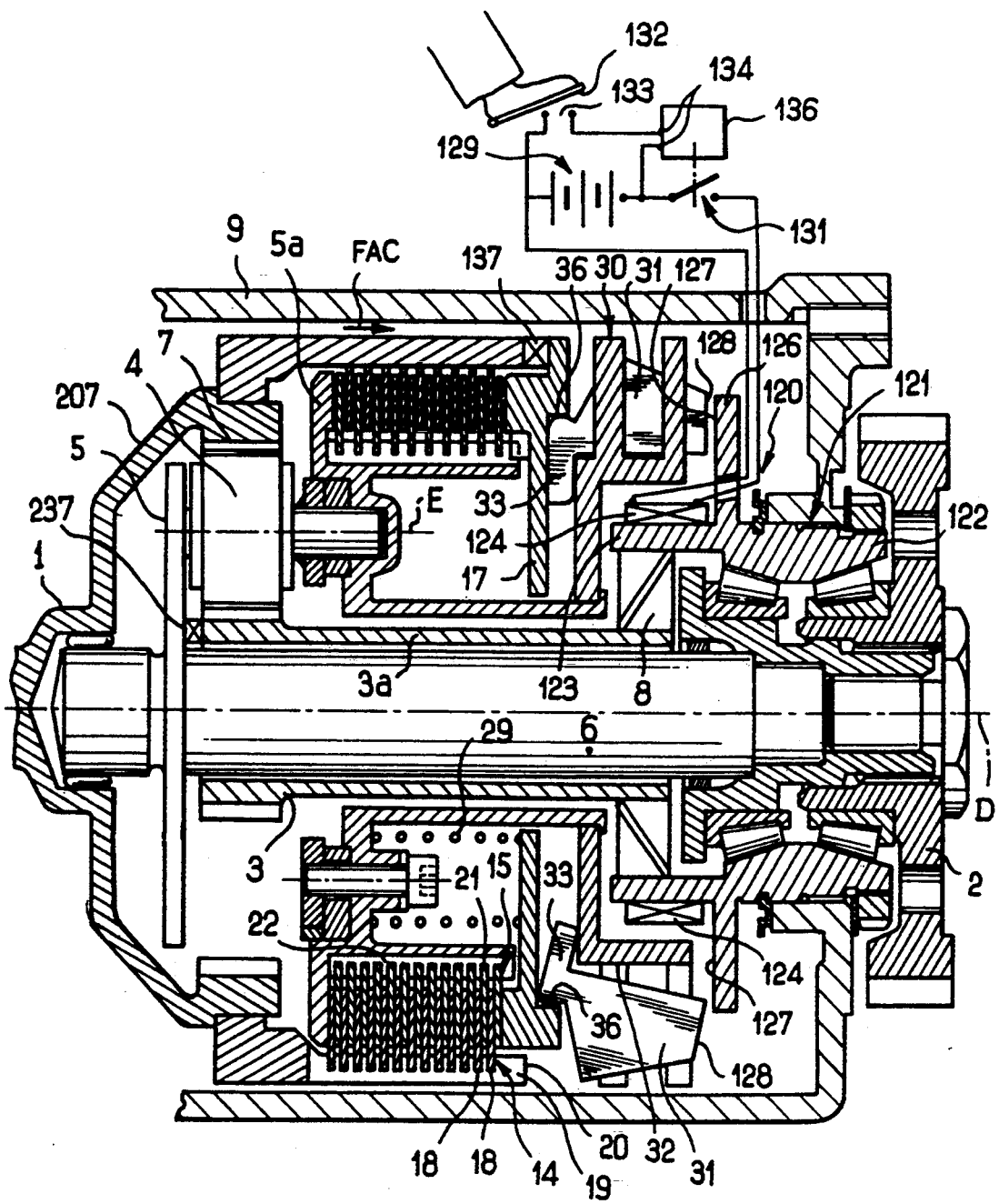
FIG. 1 is an axial sectional view of a transmission having a multidisks clutch according to the invention.

The automatically shifted transmission shown in FIG. 1 comprises in a casing 9, a combination of gears defining different transmission ratios between an input shaft 1 adapted to be at least indirectly connected to a power source such as a vehicle engine, and an output 2 adapted to be coupled to driving wheels of a vehicle by way of further transmission means not shown.

In the example shown in FIG. 1, the combination of gears comprises a planetary train -also called "epicyclic train"-. A ring gear 7 is rigidly connected to the input shaft 1 by a bell-shaped element 207, thereby to be driven in rotation by the input shaft 1. The ring gear 7 has inner teeth meshing with planet gears 4 mounted for free rotation on a planet carrier 5. The latter is fast with a central shaft 6 connected to the output 2 and having the same axis of rotation D as the input shaft 1. There can be provided, for example, three planet gears 4 (only one of which is shown in FIG. 1) which are pivotally mounted about three axes E which are distributed about the axis D.

The teeth of the planet gears 4 moreover mesh with a sun gear 3, which is also centered on axis D, and is rotatable about central shaft 6.

As is wellknown, the transmission ratio between the input 1 and the output 2 depends upon mechanical couplings which are achieved between the rotary elements (sun gear 3, planet carrier 5 and ring gear 7) of the planetary train. In the example shown, said mechanical couplings are selectively performed between the planet carrier 5 and the ring gear 7. A free wheel 8, mounted between a stationary part of the transmission device and a tubular extension shaft 3a of the sun gear 3, prevents the sun gear 3 from rotating in the direction which is reverse with respect to that of the input shaft 1.

A multidisks clutch is mounted for providing selective coupling between two rotary elements of the combination of gears, more specifically between the ring gear 7 and the planet carrier 5. This clutch comprises a stack of axially slidable disks 14, 15.

First disks 14 of the stack are connected for common rotation with the ring gear 7. To this end, said disks 14 are provided on their external edge with external teeth 18 which are seated in internal splines 19 of the ring gear 7 which are parallel to axis D. The splines 19 have an open bottom. They are defined between fingers 20 belonging to the ring gear 7. The splines 19 allow for axial sliding of the disks 14 with respect to the ring gear 7.

Second disks 15 of the stack, alternating with the first disks 14, are connected for common rotation with the planet carrier 5. To this end, said second disks are provided on their inner edge with inner teeth 21 which are seated in external splines 22 extending parallel to axis D and belonging to the planet carrier 5. The splines 22 allow for axial sliding of the disks 15 with respect to the planet carrier 5.

The stack of disks 14, 15 can be selectively clamped between a backing flange 5a of the planet carrier 5 and a plate-shaped clamping pusher 17. The clamping pusher 17 belongs to an actuating mechanism also comprising biasing springs 29 (only one of which is shown), distributed about axis D, centrifugal weights 31 and a weight-carrier 30 having a slit 32 for each weight 31. The carrier 30 is fast with the planet-carrier 5. The clamping pusher 17 is axially interposed between the weight-carrier 30 and the stack of disks 14, 15, and is connected for common rotation with the planet-carrier 5 while being axially slidable with respect to the planet-carrier 5.

When the clamping pusher 17 is axially urged towards the backing flange 5a with a sufficient thrust, the stack of disks 14, 15 is tightened together and the ring gear 7 and the planet-carrier 5 are coupled together. The biasing springs 29 are mounted between the planet carrier 5 and the clamping pusher 17. The thrust produced by said springs 29 tends to urge the clamping pusher 17 axially away from the backing flange 5a and thus to release the stack of disks 14, 15.

Each weight 31 comprises a nose 33 a portion of which, having an axial displacement component, engages the pusher 17. The nose 33 operates as a cam defining the spacing between the pusher 17 and the carrier 30 which is stationary with respect to the backing flange 5a. The weights 31 are driven in rotation at the speed of rotation of the output 2 and thus apply to the pusher 17, as soon as the thrust of the springs 29 is overcome, a thrust which is a monotonously increasing function of the speed of rotation of the output 2.

If the speed of rotation of the planet carrier 5 is low or even equal to zero, the pusher 17 repelled by the springs 29 maintains the weights 31 in the rest position shown in the upper part of FIG. 1, adjacent the bottom of the respective slits 32. When this speed of rotation increases, the weights 31 leave their rest position under the action of the centrifugal force. The noses 33 of the weights are retained by a projection 36 at the periphery of the clamping pusher 17, whereby the weights 31 pivot as shown in the lower part of FIG. 1. As a consequence of this pivotal movement, the noses 33, whose portion engaging the pusher 17 has an axial displacement-component, axially space apart the clamping pusher 17 from the carrier 30. As the carrier 30 is rigidly connected to the backing flange 5a, the clamping pusher 17 is urged towards the backing flange 5a against the action of the biasing springs 29.

Thus, beyond a predetermined speed of rotation of the planet carrier 5, the centrifugal force which appears in the weights 31 raises the weights 31 as shown in the lower part of FIG. 1, whereby the weights 31 urge the pusher 17 towards the stack of disks against the action of the biasing springs 29.

The difference between the axial thrust produced by the weights 31 on the pusher 17 and the contrary thrust produced on the same pusher 17 by the springs 29 constitutes a clamping force of the stack of disks 14, 15.

Depending upon the torque to which the input shaft 1 is subjected, this clamping force will be high enough or not for coupling the planet carrier 5 to the ring gear 7 of the epicyclic train. If the torque applied to the input shaft 1 is relatively low by comparison with the speed of rotation of the output 2, the clamping force will be high enough, and the planet carrier 5 will be fast with the ring gear 7. There is thus a direct drive connection between the input shaft 1 and the output 2 of the transmission. In this situation, the planets 4 cannot roll on the ring gear 7 and accordingly cannot rotate on themselves about their own axis E. As a consequence, the planets 4 are also unable to roll onto the sun gear 3 and, as a result, the sun gear 3 rotates in unison with the ring gear 7 and the planet carrier 5, as allowed by the free wheel 8.

By contrast, if the torque applied to the input shaft 1 is realtively high by comparison with the speed of rotation of the planet carrier 5, the clamping force applied to the stack of disks 14, 15 is not high enough for coupling together the ring gear 7 and the planet carrier 5. In this case, as the planet carrier 5 tends to remain stationary under the action of the load to be driven by the output 2, the planets 4 tend to operate as movement-reversal devices, that is to say to make the sun gear 3 rotate in a direction contrary to the direction of rotation of the shaft 1. This is however prevented by the free wheel 8, whereby the sun gear 3 remains stationary with respect to the casing 9, and the planet carrier 5 rotates at a speed which is intermadiate between the speed of the input shaft 1 and the speed, equal to zero, of the sun gear 3. In this case, the transmission operates as a speed-reducing gear.

Between these two situations, there is an intermadiate situation, in which the torque applied to the input shaft 1 has a medium magnitude by comparison with the speed of rotation of the planet carrier 5. This corresponds to a predetermined range of torque magnitudes of the shaft 1 for each given speed of rotation of the planet carrier 5, and to a range of speeds of rotation of the planet carrier 5 for each torque magnitude of the shaft 1. In such a situation, the clutch 14, 15 tends to remain in any pre-existing condition, that is to say to remain in the grip condition when it is in the grip condition and to remain in the slip condition when it is the slip condition. This is due to the fact that the friction coefficient between the disks changes depending upon whether the disks grip to eachother or slip on eachother.

This is an advantage of the transmission because it avoids repeated ratio-changes when the vehicle operates under conditions corresponding to a ratio-change.

On the other hand, it is generally desired that the transmission, when changing the ratio, does it relatively quickly (but not abruptly) and with the smallest possible friction between the disks, as friction generates mechanical losts, heat and wear.

Still further, it is desired, in certain circumstances, that the transmission performs a quick ratio change when there is an abrupt change of the magnitude of the torque to be transmitted. More specifically, when it is needed to pass an other vehicle, if the transmission operates in direct drive, it is desired that it shifts down intantaneously for increasing as soon as possible the torque available on the output 2.

According to the invention, for achieving this purpose, a force pulse is applied, by way of initiator means 120, to the clamping means of the clutch, in the direction corresponding to the change of condition desired for the clutch.

In the example shown in FIG. 1, the shaft 6 is supported in rotation relatively to the casing 9 by a bearing 121 comprising an external race 122 which is secured to the casing 9. For embodying the initiator means 120, this external race 122, made of ferromagnetical material, is extended by a cylindrical protrusion 123 directed towards the carrier 30 and around which a coil 124 is wound about axis D. The race 122 is also integral with a ferromagnetical flange 126 which is operable as a polar shoe having a polar face 127. In the example shown, the protrusion 123 is not only operable as a core for the coil 124, but also as the previously mentioned stationary part cooperating with the free wheel 8.

When the weights 31 are in the rest position shown in the upper part of FIG. 1, a back edge 128 of the weights faces the polar face 127.

By contrast, when the weights 31 are in the work position shown in the lower part of FIG. 1, the edge 128 of the weights is offset radially outwardly with respect to the polar face 127.

Thus, when the coil 124 is supplied with electric current, it creates in the protrusion 123 and the polar shoe 126 a magnetic field whereby the polar face 127 becomes a magnetic pole (north or south depending upon the embodiment). Thereupon, the weights 31, which are also made of ferromagnetic material, are attracted by the energised polar face 127 to remain in or move into the rest position illustrated in the upper part of FIG. 1.

For supplying the coil 124 with current, the coil 124 has been connected to the storage battery 129 of the vehicle, in series with a switch 131. The latter is normally open. It is however closed during a short time, e.g. one or two seconds, when the driver of the vehicle strongly depresses the accelerator pedal 132 and consequently closes a contact 133. The closure of said contact applies the voltage of the battery 129 to the input plugs 134 of a relay 136 controlling the switch 131. The relay 136 is of a type which entails closure of the switch 131 during the desired time duration (one or two seconds in the example) when a rising step of voltage is applied to the input plugs 134 of said relay.

Thus, when the driver strongly depresses the accelerator pedal 132, the relay 136 closes for one or two seconds the switch 131 and the coil 124 is supplied with current during one or two seconds. If at that time the weights 31 are in the work position and make the clutch operate in the grip condition, the weights 31 are subjected to a magnetic force tending to bring them back to the rest position. If this magnetic force is high enough to sufficiently reduce clamping of the clutch to entail slip of the clutch 14, 15 under the action of the torque to be transmitted (which has increased as a consequence of the accelerator pedal being more depressed), then the transmission automatically shifts down and the torque available on the output 2 is increased.

The whole is designed for ensuring that the magnetic force tending to bring back the weights 31 into the rest position will not be high enough to release the clutch when the speed of rotation would entail an overspeeding of the input shaft 1.

There has been shown in the upper part of FIG. 1 a modified embodiment in which an axial thrust bearing 137 is mounted between the ring gear 7 and the pusher 17.

As is conventional, the teeth of the sun gear 3, the planets 4 and the ring gear 7 are of the helical type. This is classical for cancelling the noise of operation of the gears. It is know however that the helical teeth produce, when in operation, an axial thrust on the parts provided with said teeth. As a consequence, during the speed-reducing operation, the ring gear 7 generates an axial thrust $F_{AC}$ which is transmitted to the pusher 17 by the axial thrust bearing 137, and which is proportional to the torque on the input shaft 1. As a consequence, the more the torque on the input shaft 1 is high, the more the speed of rotation of the planet carrier 5 will have to be high for allowing the axial thrust applied by the weights 31 on the pusher 17 to overcome not only the biasing force of the springs 29 but also, in addition, the axial thrust $F_{AC}$ produced by the helical teeth of the ring gear 7. The axial thrust $F_{AC}$ is thus, during the speed-reducing operation, a thrust component which monotonously increases as a function of the torque on the shaft 1 and which is substracted to the component originating from a centrifugal effect in the weights 31, which latter component monotonously increases as a function of the speed. Thus, when the torque is high, shifting of the transmission occurs at higher speeds of the output 2, as is desired by the drivers of the motor vehicles.

By contrast, when the clutch is tightened, no effort is transmitted between the teeth of the planets 4 and those of the ring gear 7 and, as a consequence, the axial reaction $F_{AC}$ disappears. In other words, once shifting up has occured, a subsequent shifting down of the transmission will need a substantial decrease of the speed of rotation or a substantial increase of the torque on the shaft 1. As soon as the transmission has shifted down, the axial thrust $F_{AC}$ appears again and, consequently, stabilizes the operation in the speed-reducing condition.

In other words, each time the transmission shifts up or down, not only the friction coefficient, but also and mainly the axial thrust $F_{AC}$ vary in the direction stabilizing the transmission ratio just activated.

With this improvement, the method of initiating the changes of condition by means of pulses according to the invention is particularly advantageous. For entailing a change of condition, it is enough to initiate it by a thrust pulse applied to the clamping means. Once the change has taken place, the axial thrust $F_{AC}$ stabilizes the ratio change just performed.

It should be noted that when the axial thrust $F_{AC}$ is present, the sun gear 3 is subjected to an axial thrust in the contrary direction, i.e. towards the left of FIG. 1. This axial thrust is supported by an axial thrust bearing 237 mounted between the sun gear 3 and the planet carrier 5 which is itself retained against axial displacement by bearing 121.

The example of FIGS. 2 and 3 will be described only as to its differences over that of FIG. 1.

Springs 29 are still provided for biasing the pusher 17 towards the clutch-release position. However, springs 29 are now belleville springs allowing a much more compact embodiment for the pusher 17 and the weight-carrier 30.

Independently from the feature of the belleville springs, an annular polar shoe 138, secured to the casing 9 arround the array of weights 31, has been provided instead of the coil 124 and the polar shoe 126 of FIG. 1. The radially inner face of the polar shoe 138 has a generally cylindrical shape and has a polar face 139 able to attract the weights 31 radially outwardly for displacing them from the rest position shown in FIG. 2 towards the work position similar to that shown in the lower part of FIG. 1.

For generating the magnetic field which is necessary in the polar shoe 138, the latter is provided on its radially outer face, facing away from the polar face 139, with cores 141 which are angularly distributed about the axis D. A coil 142 is formed about each core 141.

The relay 136 (FIG. 1) is replaced by a relay 143 which controls a brief closure of the switch 131 when it receives a decreasing step of voltage on its input plugs 134. The contact 133 of the accelerator pedal 132 is mounted in parallel with a contact 144 which is normally closed, but opens when a tachymeter device 146 detects that the speed of rotation of the output 2 is higher than a predetermined threshold.

Thus a decreasing step of voltage reaches the input plugs 134 of the relay 143 when either one of the contacts 133 and 144 opens while the other one is already open. This situation occurs for example when the speed increases over the predetermined threshold of the tachymeter device 146 while the driver merely gently depresses the accelerator pedal 132. In such a case, the switch 131 is briefly closed and if the weights 31 are in the rest position shown in FIG. 2, they will be attracted radially outwardly and consequently they will tend to move to the work position, or else, if they are initially in the work position, they will be more strongly attracted in this position. This will increase the clamping force applied to the stack of disks and, if the grip condition does not yet prevail between the disks this will perform the grip condition and accorddingly the direct drive condition in the transmission.

If the torque on the shaft 1 is too high for allowing the grip condition to be achieved despite the increased clamping provided by the electromagnetic force pulse, this means that shifting up is not desirable, and the transmission advantageously continues to operate as a speed reducer despite the electromagnetic pulse.

The example shown in FIG. 4 will be described only as far as its differences over FIG. 1 are concerned.

The electrical circuit is the same as in FIG. 1 but the circuit no longer supplies an electromagnet acting on the weights, but an electromagnet 147 acting on a plunger core 148 which controls by way of a two-arms lever 149 a pulling rod 151 which is axially movable inside the shaft 6. The rod 151 is provided with radial arms 152 which radially project out of shaft 6 through openings 153 of the shaft 6. The radial arms 152 extend between bell-shaped element 207 and a spider 205. The spider 205 is a part of the planet-carrier which is directly connected to the central shaft 6 on that side of the gears which is remote from the pusher 17. The radial arms 152 are bent at right angle into axial fingers 252 slidably extending through tubular trunnions 204 supporting the planets 4. The fingers 252 engage the pusher 17 to urge the latter in the direction of release of the stack of disks 14, 15 when the electromagnet 147 is energized.

As a consequence, when the elctromagnet 147 is energized, the pusher 17 is subjected to a force pulse in the clutch-release direction and allows shifting down in the same conditions as those disclosed in connection with the electromagnet 123, 124 126 of FIG. 1.

Figure 5:
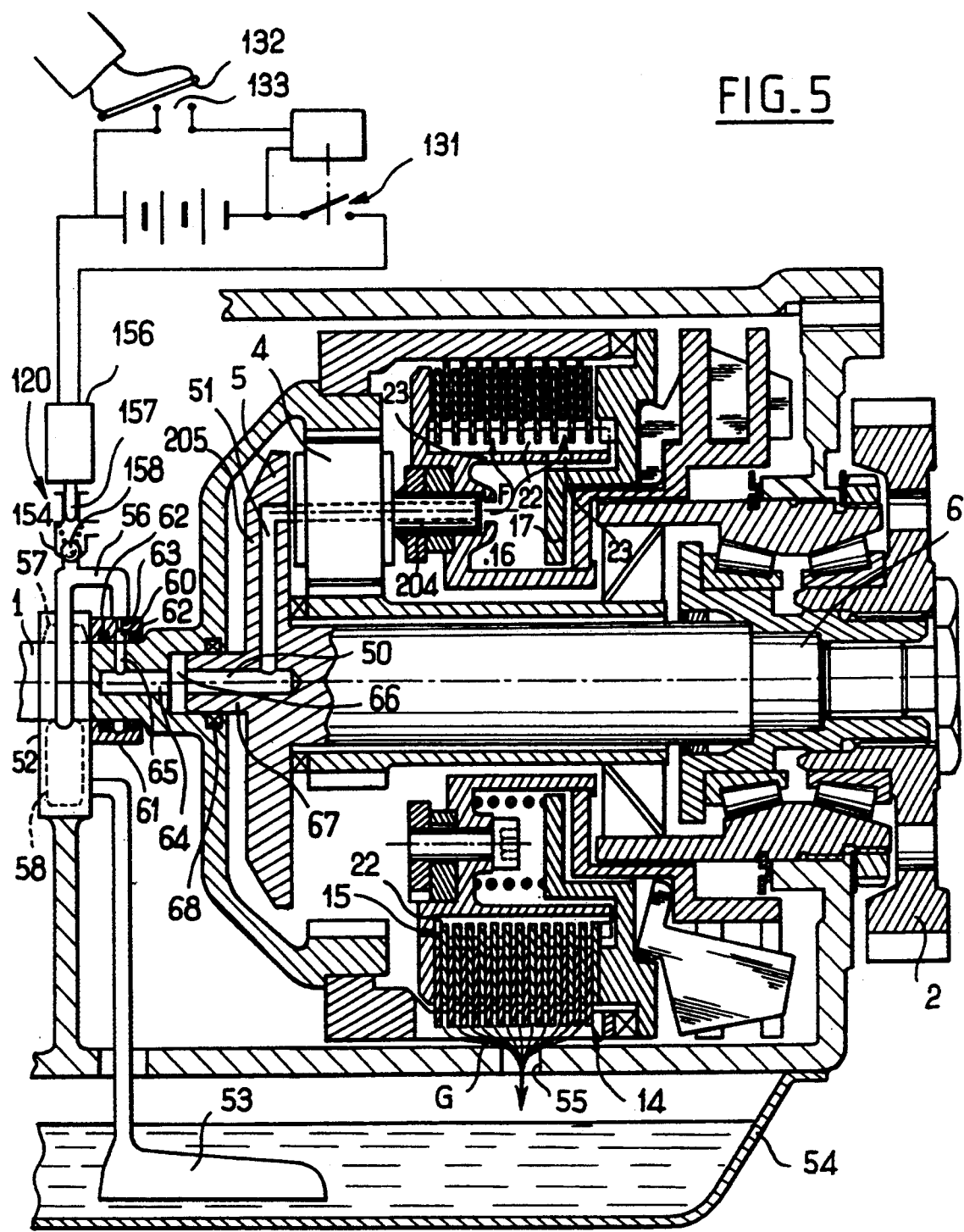

In the example of FIG. 5, an hydraulic pressure is used for creating force pulses.

The planet carrier 5 and the pusher 17 define between them an annular chamber 16 which is peripherally closed by the stack of disks 14, 15.

The central shaft 6 comprises an axial duct 50 which is in fluid communication with the hollow interior of the tubular trunnions 204 via radial bores 51 provided in the spider 205. The hollow interior of the tubular trunnions 204 opens into the chamber 16. The duct 50, bore 51 and trunnions 204 are operable for injecting oil into the chamber 16. The oil which is so injected fills the chamber 16 while flowing therethrough as indicated schematically by the arrows F, and flows out of chamber 16 by orifices 23 through the bottom of the splines 22 or by the free axial end of the splines 22, and then through passages defined by substantially radially extending grooves (not shown) in the friction faces of some at least of the disks 14, 15. When the disks slip on each other, the oil accomodated in said grooves anoints the adjacent friction face pertaining to the adjacent disk thereby to lubricate the friction contact. Thereafter, said oil arrives in the casing 9 outside the ring gear 7 through the open bottom of the splines 18, as indicated by the arrows G. From there, the oil falls again in a lower oil-pan 54 through an aperture 55 of the casing 9.

To supply with oil the chamber 16 by way of the duct 50, it is possible to provide a pump 52, for example a gear pump having gears 57, 58. In the example shown in FIG. 5, an oil intake 53 picks up oil in the oil-pan 54. The pump 52 sucks the oil picked up by the intake 53 and injects the same under pressure in an outlet tubing 56. The pump 52 is driven by the input shaft 1 of the transmission (one 57 of the gears of the pump 52 is mounted onto the input shaft 1).

The outlet tubing 56 of the pump 52 is connected to an annular chamber 60 which is machined on the inner wall of a stationary ring 61 in which the input shaft 1 is pivotally mounted. Two packings 62 provide leaktightness between the input shaft 1 and the ring 61 on either side of the annular chamber 60. A radial orifice 63 extends in the ring 61 between the annular chamber 60 and the connection with the tubing 56 for feeding pressurized oil into the chamber 60.

An axial duct 64 is provided adjacent the end of the input shaft 1 adjacent the central shaft 6. The axail duct 64 communicates with the annular chamber 60 of the ring 61 through a radial bore 65. The axial duct 64 opens into a cylindrical recess 66 provided at the end of the input shaft 1 adjacent the central shaft 6. The cylindrical recess 66 pivotally recieves a cylindrical extension 67 of the central shaft 6, in which ends the axial duct 50 of the shaft 6. An annular packing 68 provides leaktightness between the recess 66 and the extension 67.

Thus, the pressurized oil produced by the pump 52 reaches the oil chamber 16 of the multidisks clutch by successively traveling through the tubing 56, the radial orifice 63, the annular chamber 60, the radial bore 65, the axial duct 64 of the input shaft 1, the axial duct 50 of the central shaft 6, the radial bores 51, and the tubular trunnious 204.

There is moreover provided a pressure-limiting valve 154 connected to the outlet tubing 56 of the pump 52. This valve normally limits at a predetermined pressure magnitude the pressure delivered by the pump 52 to the chamber 16.

An electromagnet 156 having a plunger core 157 is mounted for allowing opening of the valve 154 when said electromagnet is not energized, and for blocking the valve ball 158 in the closed position by the plunger core 157 when the electromagnet 156 is energized. The electromagnet 156 is connected to an electric circuit which is identical to that of FIG. 1, so that said electromagnet is supplied with a pulse of one or two seconds when the user strongly depresses the accelerator pedal 132. In such circumstances, the pressure limiting valve 154 cannot open, so that the pump 52 delivers to the chamber 16 a higher pressure during the energization time duration of the electromagnet 156. This higher pressure during a short duration is applied to the pusher 17 and produces thereon a force pulse in the clutch-release direction.

Of course, this invention is not limited to the embodiments disclosed.

It is also possible to use the invention in a clutch having clamping means which are not actuated by any centrifugal froce, for example a clutch exclusively actuated by an axial thrust originating from a meshing between helical teeth.

I claim:

1. A clutch comprising:
   first and second friction disks which are respectively connected for common rotation with a first and a second rotatory element;
   clamping means for selectively and variably applying said friction disks into mutual frictional contact, thereby controlling the clutch between a slip condition and a grip condition;
   force-generating means for applying to the clamping means a first actuating force component which is substantially continuous at least when the clutch is in the grip condition, for maintaining the clutch in said grip condition;
   hysteresis means for varying a parameter of operation of the clutch in a direction promoting maintained slip condition of the clutch when the clutch changes from the grip condition to the slip condition and in a contrary direction of the clutch when the clutch changes from the slip condition to the grip condition; and
   control means for controlling selective application of a control force to the clamping means as a second actuating force component.

2. The clutch according to claim 1, wherein the control means are adapted for controlling application of the control force in the form of thrust pulses.

3. The clutch according to claim 1, wherein said parameter is a friction coefficient.

4. The clutch according to claim 1, wherein said parameter is the first actuating force component.

5. The clutch according to claim 1, comprising a power-means for generating the control force.

6. The clutch according to claim 5, wherein the power-means are fluid pressure means.

7. The clutch according to claim 5, wherein the power-means are electromagnetic means.

8. The clutch according to claim 5, comprising a mechanical coupling between said power means and the clamping means.

9. The clutch according to claim 8, wherein said mechanical coupling extends through a bore along a central shaft of the clutch and extends from said bore to the clamping means through a side opening of said central shaft.

10. The clutch according to claim 1, wherein said force-generating means comprise means for applying to the clamping means a continuous force component which has a magnitude independent from the slip and grip conditions of the clutch.

11. The clutch according to claim 10, wherein said continuous force-component varies as a continuous function of a second parameter at least across a predetermined substantial range of variation of the second parameter.

12. The clutch according to claim 11, wherein the force-generating means comprise, for producing said continuous force-component, pivotal flyweights having a portion which has an axial component of displacement, and wherein the clamping means comprise a force-transmitting pusher engaged by said portions of the flyweights and operatively connected to the power means, whereby the continuous force-component and the control force are transmitted together, as a resultant force, to the clamping means.

13. The clutch according to claim 5, wherein the power-means comprise an electromagnet and the control means are adapted for supplying the electromagnet with electric pulses.

14. The clutch according to claim 13, wherein the force-generating means comprise centrifugal weights, and wherein the electromagnet has a polar face positioned for magnetically influencing a ferromagnetic portion of the weights, thereby applying the thrust pulses to the centrifugal weights, whereby the force-component and the thrust pulses are transmitted together, as a resultant force, to the clamping means.

15. The clutch according to claim 14, wherein the polar face is formed on an external race of a roll bearing, and wherein a coil of the electromagnet is wound around the external race.

16. The clutch according to claim 15, wherein the electromagnet comprises a metal ring provided on one face with cores extending therefrom, said cores being surrounded by coils wound thereon and being angularly distributed about the axis of rotation with respect to which the weights are subjected to a centrifugal force.

17. A clutch comprising:
   first and second friction disks which are respectively connected for common rotation with a first and second rotatory element;
   clamping means for selectively and variably applying said friction disks into mutual frictional contact, thereby controlling the clutch between a slip condition and a grip condition;

force-generating means for applying to the clamping means a first actuating force component which is substantially continuous at least when the clutch is in the grip condition, for maintaining the clutch in said grip condition;

hysteresis means for automatically modifying the first actuating force component in a direction of release of the clutch when the clutch changes from the grip condition to the slip condition and in a contrary direction of increased clamping of the clutch when the clutch changes from the slip condition to the grip condition;

power-means for generating a control-force; and control means for controlling selective application of said control force to the clamping means as a second actuating force component.

18. The clutch according to claim 17 wherein the control means are adapted for controlling application of the control force in the form of thrust pulses.

19. The clutch according to claim 17, wherein the power-means are fluid pressure means.

20. The clutch according to claim 17, wherein said force-generating means comprise means for applying to the clamping means a continuous force component which has a magnitude independent from the slip and grip conditions of the clutch.

21. The clutch according to claim 20, wherein said continuous force-component varies as a monotonous function of a second parameter at least across a predetermined substantial range of variation of the second parameter.

22. The clutch according to claim 21, wherein the force-generating means comprise, for producing said continuous force-component, pivotal flyweights having a portion which has an axial component of displacement, and wherein the clamping means comprise a force-transmitting pusher engaged by said portions of the flyweights and operatively connected to the power means, whereby the continuous force-component and the control force are transmitted together, as a resultant force, to the clamping means.

23. A transmission device having at least two transmission ratios, comprising transmission elements which are in intermeshing relationship by means of gear teeth, a clutch mounted for selectively coupling together and uncoupling from each other two said transmission elements thereby determining which one of said transmission ratios prevails, clamping means capable of movement in a clutch-clamping direction and in a clutch-release direction and to transmit in the clutch-clamping direction an actuating force to friction elements of the clutch, force-generating means for generating and applying to the clamping means at least one first force component which is essentially continuous at least when the clutch is in the grip condition, hysteresis means for automatically modifying the first force-component in a direction of release of the clutch when the clutch is in the slip condition and in a direction of increased clamping of the clutch when the clutch is in the grip condition, and control means for controlling selective application of a control force to the clamping means in a predetermined one of said clutch clamping direction and clutch-release direction.

24. The transmission device according to claim 23 wherein the control means are adapted to control application of the control force to the clamping means in said predetermined direction in the form of thrust pulses.

25. The transmission device according to claim 23, comprising a power-means for generating the control force.

26. The transmission device according to claim 25, wherein the clamping means are operatively mounted between said clutch and said force-generating means, and wherein the power-means are arranged for applying the control force to the clamping means independently of the force-generating means.

27. The transmission device according to claim 25 wherein the power-means are mounted for applying the control force to the force-generating means, whereby the first-force component and the control force are transmitted together, as a resultant force, to the clamping means.

28. The transmission device according to claim 25, wherein the power means are fluid-pressure means.

29. The transmission device according to claim 25, comprising a mechanical coupling between the power means and the clamping means.

30. The transmission device according to claim 29, wherein said mechanical coupling extends through a bore along a central shaft of the transmission device and extends from said bore to the clamping means through a side opening of said central shaft.

31. The transmission device according to claim 23, wherein the force-generating means are adapted to produce, as at least part of the first force-component, a force which varies as a function of a parameter for controlling the clutch thereby changing the transmission ratio when said parameter varies through a range of magnitude.

32. The transmission device according to claim 31, wherein the force-generating means are responsive to the parameter for varying said first force component as a substantially continuous and monotonous function of the parameter across at least a substantial range of variation of the parameter including said range of magnitude.

33. The transmission device according to claim 23, wherein the force-generating means comprise pivotal weights having a portion which has an axial component of displacement, and wherein the clamping means comprise a force-transmitting pusher engaged by said portion of the weights and operatively connected to the power-means.

34. The transmission device according to claim 25, wherein the power-means comprise an electromagnet and the control means comprise means for supplying the electromagnet with an electric pulse.

35. The transmission device according to claim 34, wherein the force-generating means comprise centrifugal weights for generating at least part of the first force-component, and wherein the electromagnet has a polar face positioned for magnetically influencing a ferromagnetic portion of the weights, whereby the control force is applied to the centrifugal weights, and the control force and said at least part of the first force-component are transmitted together, as a resultant force, to the clamping means.

36. The transmission device according to claim 35, wherein the polar face is formed on an external race of a roll bearing, and wherein a coil of the electromagnet is wound around the external race.

37. The transmission device according to claim 36, wherein the electromagnet comprises a metal ring provided on one face with cores extending therefrom, said cores being surrounded by coils wound thereon, and being angularly distributed about the axis of rotation with respect to which the weights are subjected to a centrifugal force.

38. The transmission device according to claim 23, wherein the hysteresis means are adapted to modify the first-force component with a stabilizing force component which varies in the direction of release of the clutch when the clutch changes from the grip condition to the slip condition and in the direction of allowing increased clamping of the clutch when the clutch changes from the slip condition to the grip condition.

39. The transmission device according to claim 38, wherein the hysteresis means apply to the clamping means, as said stabilizing force-component, a reaction force produced by a said transmission element which is differently loaded depending upon which one of said grip condition and slip condition prevails in the clutch.

40. The transmission device according to claim 38, wherein said reaction force is produced by meshing of gear teeth of said transmission element under load.

41. The transmission device according to claim 39, wherein said reaction force is produced in an axial direction by meshing of helical gear teeth of said transmission element under load.

42. The transmission device according to claim 38, or 39, wherein the force-generating means are adapted for generating, as said first force-component, a centrifugal force having a magnitude depending upon a rotating speed in the transmission device and for applying said centrifugal force to the clamping means in said clutch-clamping direction, and wherein said hysteresis means apply said stabilizing force component to the clamping means in said clutch-release direction thereby variably counteracting said centrifugal force.

43. A clutch comprising:
first and second friction disks which are respectively connected for common rotation with a first and a second rotatory element;
clamping means for selectively and variably applying said friction disks into mutual frictional contact, thereby controlling the clutch between a slip condition and a grip condition according to whether an actuating force is applied to the clamping means in a clamping direction with a sufficient magnitude to allow the first and second disks to transmit a prevailing torque;
force-generating means for applying to the clamping means a first force component of said actuating force;
hysteresis means for automatically varying said first force component in a direction promoting slip condition of the clutch when the clutch changes from the grip condition to the slip condition and in a contrary direction promoting grip condition of the clutch when the clutch changes from the slip condition to the grip condition; and
control means for selectively applying to the clamping means a control force-component of the actuating force.

44. The clutch according to claim 43, further comprising power means for generating the control force component.

45. The clutch according to claim 43, wherein the hysteresis means are adapted to transmit to the clamping means, as part of the first force-component, a reaction force which is at least in part canceled in one of the slip and grip conditions of the clutch and promotes the other one of the slip and grip conditions of the clutch.

46. The clutch according to claim 43, wherein the hysteresis means are adapted to transmit to the clamping means, in the direction of release of the clutch, and as part of the first force-component, a reaction force which is at least in part canceled when the clutch is in the grip condition.

47. The clutch according to claim 43, wherein the control means are adapted to apply the control component in the form of thrust pulses.

48. The clutch according to claim 13, wherein the control means are fluid-pressure operated.

49. A transmission device having at least two transmission ratios, comprising transmission elements which are in intermeshing relationship by means of gear teeth, a clutch mounted for selectively coupling together and uncoupling from each other two said transmission elements thereby determining which one of said transmission ratios prevails, said clutch comprising:
first and second friction disks which are respectively connected for common rotation with a first and a second rotary element;
clamping means for selectively and variably applying said friction disks into mutual frictional contact, thereby controlling the clutch between a slip condition and a grip condition according to whether an actuating force is applied to the clamping means in a clamping direction with a sufficient magnitude to allow the first and second disks to transmit a prevailing torque;
force-generating means for applying to the clamping means a first force-component of said actuating force;
hysteresis means for automatically varying said first force component in a direction promoting slip condition of the clutch when the clutch changes from the grip condition to the slip condition and in a contrary direction promoting grip condition of the clutch when the clutch changes from the slip condition to the grip condition; and
control means for selectively applying to the clamping means a control component of the actuating force.

50. The transmission device according to claim 47, wherein the hysteresis means are adapted to transmit to the clamping means, as part of the first force component, a reaction force which is at least in part canceled in one of the slip and grip conditions of the clutch and promotes the other one of the slip and grip conditions of the clutch.

51. The transmission device according to claim 49, wherein the hysteresis means are adapted to transmit to the clamping means, in the direction of release of the clutch, and as part of the first force component, a reaction force which is at least in part canceled when the clutch is in the grip condition.

52. The transmission device according to claim 49 or 50, wherein the force generating means apply to the clamping means a biasing force, and the hysteresis means are adapted to transmit the reaction force in such a direction that the reaction force counteracts the biasing force.

53. The transmission device according to claim 49, wherein the control means are fluid pressure operated.

54. The transmission device according to claim 49, wherein the control means are adapted to apply the control component in the form of thrust pulses 55. The transmission device according to claim 50 or 51, wherein the reaction force is produced by one of said transmission elements which is differently loaded according to whether the grip condition and slip condition of the clutch prevails.

56. The transmission device according to claim 55, wherein said reaction force is produced by meshing of gear teeth of said transmission element under load.

57. The transmission device according to claim 55, wherein said reaction force is produced in an axial direction by meshing of helical gear teeth of said transmission element under load.

58. The transmission device according to claim 49, wherein the force-generating means are adapted for producing a centrifugal force-component having a magnitude depending upon a rotating speed in the transmission device and for applying said centrifugal force to the clamping means in the first direction tending to establish the grip condition in the clutch, and wherein said hysteresis means are adapted for applying a stabilizing force component to the clamping means in a second direction thereby variably counteracting said centrifugal force.

59. A method for controlling between a slip condition and a grip condition a clutch mounted in a transmission device, for selectively enabling said clutch to frictionally transmit a prevailing torque, with the step of inducing variable friction in said clutch by applying a variable actuating force to said clutch, said step comprising:

applying to the clutch a continuous force component comprising a reaction force which is produced in said transmission device and varies in a direction of release of the clutch when the clutch is in the slip condition and in a direction of increased clamping of the clutch when the clutch is in the grip condition; and moreover controlling application to the clutch of a control force component for selectively modifying the actuating force to promote a desired one of said slip and grip conditions of the clutch.

60. The method according to claim 59, wherein the control component is applied in the form of thrust pulses, thereby initiating changes to said desired condition of the clutch and to let said desired condition outlive the thrust pulses, as a consequence of variation of the reaction force.

61. A method for controlling an automatic transmission device capable of producing two different transmission ratios according to whether a clutch in said transmission device is in a grip condition and connects for common rotation two power-transmitting elements of the transmission device and respectively is in a slip condition and allows relative rotation between said two power transmitting elements, comprising the step of inducing variable friction in said clutch by applying a variable actuating force to said clutch, said step comprising:

applying to the clutch a continuous force component comprising a reaction force which is produced in said transmission device and varies in a direction of release of the clutch when the clutch is in the slip condition and in a direction of increased clamping of the clutch when the clutch is in the grip condition; and moreover controlling application to the clutch of a control force component for selectivity modifying the actuating force in a sense promoting a desired one of said slip and grip conditions of the clutch.

62. The method according to claim 61, wherein the control component is applied in the form of thrust pulses, thereby initiating changes to said desired condition of the clutch and to let said desired condition outlive the thrust pulses, as a consequence of variation of the reaction force.

* * * * *